Figure 1:
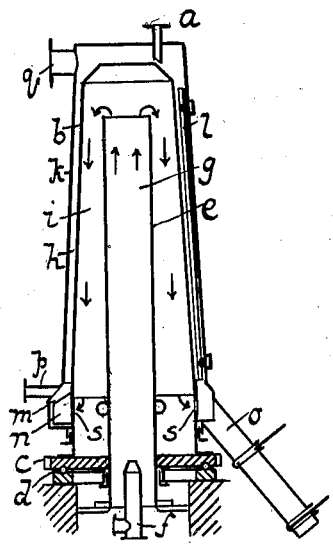

Sept. 5, 1933.                M. PIER ET AL                    1,925,566
        APPARATUS FOR THE RECOVERY OF VOLATILIZABLE ORGANIC
           SUBSTANCES FROM MATERIALS CONTAINING THE SAME
                        Filed July 9, 1928

Mathias Pier
Karl Winkler
INVENTORS

BY
ATTORNEYS

Patented Sept. 5, 1933

1,925,566

UNITED STATES PATENT OFFICE 1,925,566

APPARATUS FOR THE RECOVERY OF VOLATILIZABLE ORGANIC SUBSTANCES FROM MATERIALS CONTAINING THE SAME

Mathias Pier, Heidelberg, and Karl Winkler, Ludwigshafen-on-the-Rhine, Germany, assignors to I. G. Farbenindustrie Aktiengesellschaft, Frankfort-on-the-Main, Germany, a corporation of Germany Application July 9, 1928, Serial No. 291,402, and in Germany July 29, 1927

3 Claims. (Cl. 202—218)

This invention relates to improvements in the recovery of organic substances which are volatilizable at an elevated temperature from mixtures thereof with solid materials and in apparatus therefor.

When the usual and already known distillation methods are employed for the recovery of organic substances from materials containing the same, such as the oils from the oleaginous residues left in the destructive hydrogenation of carbonaceous materials, such as coal of all varieties and the like, considerable loss arises owing to superheating and consequent production of coke. Various kinds of apparatus have already been proposed for the said process, the materials, for example, being heated in a thin layer of continuously regulated depth, the material under treatment being stationary on its support during the operation. Even in this case, however, local superheating, with the consequent formation of coke and incrustations is not prevented. Apparatus of the said kind are also attended with the objection that the material to be treated must be spread out over large surfaces, and therefore very large apparatus are required. The uniform distribution and heating of the material on these surfaces is also a matter of difficulty.

We have now found that the recovery of organic substances which are volatilizable at an elevated temperature from mixtures thereof with solid materials such as the oils from the oleaginous residues left in the destructive hydrogenation of carbonaceous materials, such as coal of all varieties and the like, may be advantageously effected by gradually heating the said materials up to a temperature at which the said organic substances volatilize without any substantial coking while allowing the said mixtures to flow in a pasty or viscous condition, and in thin layers over a surface, the solid residues being preferably removed continuously.

The thin layer flowing over the said surface may be produced in various ways. For example, the pulpy or viscous mass may be allowed to flow over the surfaces of bodies, such as cylinders or cones rotatably mounted on a vertical, inclined or horizontal axis, the speeds being regulated in each case so that the liquid mass moves relatively to the supporting surface. The surfaces may also be stationary and the feed point movable. The surface of the body employed may be varied in shape, as for example, more or less conical, according to the viscosity of the substances to be treated and the amount of solids contained therein. The rotational velocity of the body depends on the dimensions of the surface, the temperature employed and the material to be treated. The thin layers of the flowing liquid may also be produced on continuously oscillating spiral surfaces or bands, or on large flat surfaces or the like, the said surfaces dipping periodically into the material under treatment, or being laden therewith in any other known and suitable manner. The surfaces are preferably heated from the rear side, for example by burners or waste heat such as that from gas engines.

The masses freed from the volatile constituents may be removed in various ways, as for example by scrapers, or by blowing or suction devices. When rotating bodies as before described are used, the scrapers, which in the case of rounded surfaces preferably act at an angle to the tangent of the surface, are preferably arranged in such a way as to remove the solid residues after sufficient time has elapsed for the distillation of the volatile constituents. The scrapers may be mounted parallel with the axis of the body or at an angle therewith, and may consist of a single scraper, or of a number arranged in stages one above the other. The detached residues may drop, for example, into a trough surrounding the lower periphery of a rotating body and be conveyed by a scraper, integral with the said body and fitting in the trough, into a chamber from which they are discharged either continuously, as for example by a worm conveyor, or sluiced out at intervals, or removed by any other known or suitable means. The said trough may also contain water or any other liquid and serve as a weir, the still hot carbonaceous material being immediately quenched and then discharged by means of a conveyor.

It is advisable that the partial pressure of the volatilized organic substances, such as volatilizing hydrocarbons and the like, should be kept low, as for example by employing a vacuum, or scavenging gases or both these methods being hereinafter referred to for the sake of brevity as rarefaction. Scavenging gases, if used, may be allowed to act on the said flowing thin layers either in counterflow or in the same direction. When the surfaces are heated with hot gases the latter may be wholly or partially employed as scavenging gases, which may be mixed, as required, with other gases or vapors, such as steam. The vapors may be employed in a superheated state, preferably by heating them with the heating gases. Any cracking gases which may be produced during the process can be used as heating gases, after, if desired, the removal of valuable constituents which can be suitably utilized in other ways, such as unsaturated hydrocarbons like ethylene, light hydrocarbons like propane, pentane and the like. This removal can be effected by any known and suitable methods, for example those known for the recovery of gasoline from natural gas, for example by adsorption, scrubbing, compression and condensation and the like. The solid residues may be gasified by the aid of gases containing oxygen, and the resulting gases may be employed, wholly or in part, as scavenging gases, thus extensively utilizing the heat contained in the residue. If the gasification be effected in the apparatus itself, arrangement should be made for controlling the admitted amount of oxygen so that no oxygen can come into contact with the initial material or with the substances which are distilled off. The scavenging gases can be maintained in circulation by pumping.

The process herein described may be carried out in such a way that reactions with the volatilized organic substances occur at the same time. For example, if it is desired to recover mainly aromatic hydrocarbons, such as benzene, or benzene derivatives such as carbolic acid and the like, from tars, gases containing oxygen can be mixed with the scavenging gases.

The products which are volatile in the warm may, if desired, be led away, in conjunction with the scavenging gases, from one place, or in separate portions from different places, as for example at various levels in the apparatus, in which operation a certain separation—according to the nature of the volatile substances—into heavier and lighter fractions is effected at the same time.

According to the present invention a high output together with a satisfactory utilization of space is obtained.

The initial materials may consist of tars and mineral oils of any origin, especially in admixture with solid substances, as for example, tars containing much dust, oil sands and the like; also oily residues of any kind, such as those from the destructive hydrogenation of varieties of coal and the like. The liquid substances may be mixed with varieties of coal, such as brown coal dust, so that the material attains the desired consistency, and the advantage is obtained that, for example, the valuable low-temperature distillation products of the added coal are contained in the recovered products and, in certain circumstances, their value and utility are increased. The continuous removal of the residues prevents the formation of incrustations and lumps, which might lead to losses and to obstructions in the apparatus. According to the method of operating and the initial materials employed, the solid residues are in the form of coarse or fine grains or powder, and can be utilized direct, coarse material, for example, being suitable for the production of water gas. The fine residues may be used as pulverized fuel, either direct or after grinding.

The following two arrangements according to this invention described with reference to the accompanying drawing and shown in vertical cross-section, will further explain the nature thereof but the invention is not restricted thereto.

In Figure 1, the product is fed in at $a$ on to a conical cylinder $b$, which is mounted on massive plates $c$, resting in turn on balls $d$ running in a groove. In an interior shell $e$ is a burner $f$, supplying heating gases to a chamber $g$ out of which they flow in the direction of the arrows through the openings $s$, into the reaction chamber formed by the conical cylinder $b$ and the shell $k$, and are there employed as scavenging gases. The solid residues are removed by a scraper $l$ which is attached to the shell $k$ by means of springs or adjustable screws and is situated close under the intake. The said residues drop down into a chamber $m$ and are conveyed by a scraper $n$ into a residue chamber $o$. Auxiliary scavenging gases may be admitted into the reaction chamber at $p$. The scavenging gases and distilled substances escape at $q$.

Figure 2:
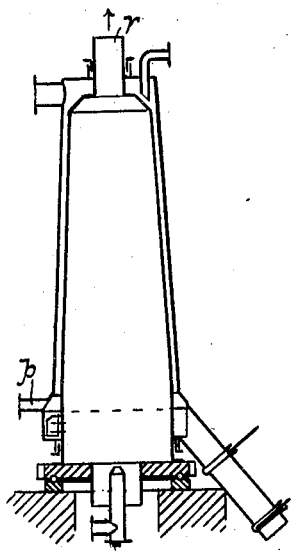

In Figure 2 a slightly modified arrangement is shown in which all the scavenging gases are admitted at $p$. In this case, the heating gases issue at $r$ and may be utilized for preheating the scavenging gases or for superheating steam.

What we claim is:

1. Apparatus for the recovery of volatilizable organic substances from mixtures thereof with solid materials, comprising a vessel, a vertical cone rotatably arranged in said vessel, means for passing heating gases through the inner part of said cone, means for causing said heating gases, after they have left the cone, to pass through the space between the wall of said vessel and said cone, means for feeding the material to be treated onto the outer surface of said cone, means for withdrawing the vapors of the volatilizable substances, and means for removing the solid residue from said vessel.

2. Apparatus for the recovery of volatilizable organic substances from mixtures thereof with solid materials, comprising a vessel, a vertical cone rotatably arranged in said vessel, means for passing heating gases through the inner part of said cone, means for causing said heating gases, after they have left the cone, to pass through the space between the wall of said vessel and said cone, means for feeding the material to be treated onto the outer surface of said cone, a scraper arranged in said vessel and scraping the surface of said cone, means for withdrawing the vapors of the volatilizable substances, and means for removing the solid residue from said vessel.

3. Apparatus for the recovery of volatilizable organic substances from mixtures thereof with solid materials, comprising a vessel, a vertical cone rotatably arranged in said vessel, means for passing heating gases through the inner part of said cone, means for causing said heating gases, after they have left the cone, to pass through the space between the wall of said vessel and said cone, means for feeding the material to be treated onto the outer surface of said cone, means for withdrawing the vapors of the volatilizable substances, and means for continuously removing the solid residue from said cone and from said vessel.

MATHIAS PIER.
KARL WINKLER.